Jan. 27, 1970  A. ABELITIS  3,491,991
APPARATUS FOR HEAT TREATING CEMENT RAW MATERIAL OR PRECIPITATED
WASTE LIME CONTAINING COMBUSTIBLE CONSTITUENT
Filed Oct. 30, 1967
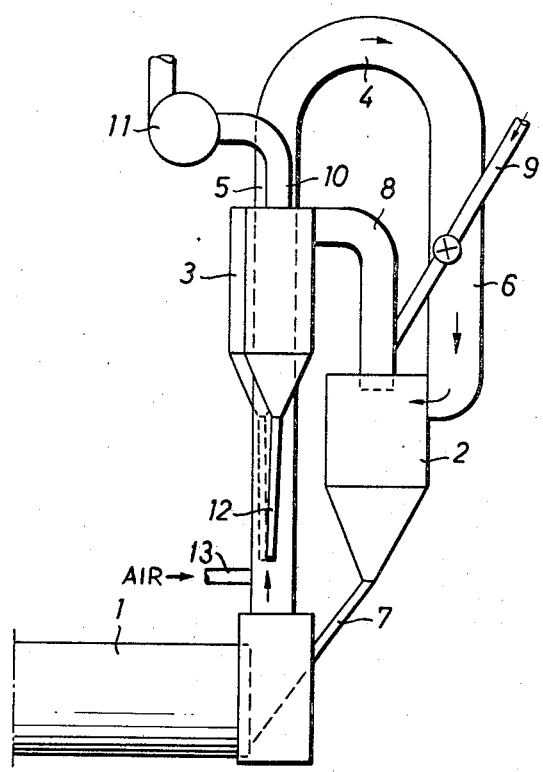
INVENTOR
Audris Abelitis

United States Patent Office 3,491,991
Patented Jan. 27, 1970

3,491,991
APPARATUS FOR HEAT TREATING CEMENT RAW MATERIAL OR PRECIPITATED WASTE LIME CONTAINING COMBUSTIBLE CONSTITUENT
Andris Abelitis, Bruhl, near Cologne, Germany, assignor to Klockner-Humboldt AG, Cologne-Deutz, Germany, a corporation of Germany
Filed Oct. 30, 1967, Ser. No. 678,793
Claims priority, application Germany, Nov. 3, 1966, K 60,624
Int. Cl. F27b 7/00, 7/36
U.S. Cl. 263—32     4 Claims

ABSTRACT OF THE DISCLOSURE

Apparatus for heat treating cement raw material or precipitated waste lime material containing combustible constituent includes a kiln, dust separator means, a waste gas duct interconnecting the kiln and the dust separator means for conducting a flow of waste gas from the kiln to the dust separator means, and means for supplying the material containing combustible constituent into the flow whereby the combustible constituent is consumed, the waste gas duct having a riser portion extending above the dust separator means and a curved downcomer portion extending downwardly to the dust separator means, the downcomer portion having a greater cross section than that of the riser portion.

---

My invention relates to apparatus for heat treating cement raw material or precipitated waste lime material containing combustible constituent.

In such apparatus, the combustible constituent is burned with the aid of waste gas containing oxygen before the cement raw material is admitted into the kiln, the waste gas conduit, which connects the kiln to a dust separator, being in the form of a duct extending upwardly above the separator and curving downwardly toward the separator.

Heretofore, in apparatus for heating fine-grain solid materials, for example as described in German Patent 1,080,920, the waste gas duct connecting the kiln with the first dust separator has been formed of a long curved pipe rising above the first separator and descending toward and connecting with the separator. The combustible constituents of an oil shale which is supplied to this waste gas pipe in the lower region thereof is thus completely consumed therein. The riser portion of this pipe is provided with a somewhat larger cross section than the descending or downcomer portion thereof. The cross section of the riser portion of the waste gas pipe is of such dimension that the minimum velocity of the upwardly flowing gas in the pipe is substantially eight (8) meters per second so that all solid material particles are certain to be entrained by and carried upwardly by the gases and will not fall downwardly into the rotary kiln. While the gases with the material containing the combustible particles flows through this elongated waste gas pipe, complete combustion of the combustible constituents in the oil shale is afforded. If, however, instead of oil shale, another material interspersed or intermixed, for example, with carbon, is supplied through the waste gas pipe for combustion thereof, the period of time during which the material is present within the pipe is insufficient for achieving complete combustion of the carbon constituent. The waste gas pipe must be made considerably longer in order to permit complete combustion of the carbon constituent contained in the material passing therethrough. This is not possible, however, because of spatial limitations and in view of fluid flow technological problems.

It is accordingly an object of my invention to provide apparatus for heat treating cement raw material or precipitated waste lime material containing combustible constituent such as carbon for example which will avoid the aforementioned disadvantage of the heretofore known apparatus of this type.

With the foregoing and other objects in view I accordingly provide apparatus of the aforementioned type wherein the waste gas pipe or duct is given a special construction so as to thereby achieve complete combustion of carbon constituent, for example, contained in the material entrained in the waste gas. The waste gas duct or pipe is accordingly provided with a downcomer portion descending to and connecting with the separator and having a larger cross section than a riser portion thereof. By this construction of the waste gas duct or pipe, the material is entrained and is upwardly driven by the waste gases in the riser portion of the waste gas duct or pipe at a greater velocity than the velocity thereof in the downcomer portion of the waste gas duct or pipe descending to and connecting with the separator, whereby an intimate intermixture and uniform distribution of the material over the entire cross section of the waste gas duct or pipe is produced. In the descending portion of the waste gas duct or pipe, the material descends relatively slowly due to the larger cross section of the duct or pipe and thereby necessarily slower velocity of the waste gas therein. Since the flow of the gas in the descending portion of the waste gas duct or pipe is in a downward direction, there is no danger of the material tending to bake together even for relatively slow flow velocities, so that slow gas velocities and therewith relatively lengthy periods during which the material is present within the waste gas duct are permitted even when the waste gas duct is of relatively short length. The cross section of the descending portion of the waste gas duct can be such that the gas velocity therein is only between approximately 1 to 5 meters per second. In this manner, the combustible carbon constituents are certain to be consumed while the cement raw material is carried by the waste gas flow in suspension through the waste gas duct.

Other features which are considered as characteristic for the invention are set forth in the appended claims.

Although the invention is illustrated and described herein as embodied in apparatus for heat treating cement raw material or precipitated waste lime containing combustible constituents, it is nevertheless not intended to be limited to the details shown, since various modifications and structural changes may be made therein without departing from the spirit of the invention and within the scope and range of equivalents of the claims.

The construction and method of operation of the invention, however, together wtih additional objects and advantages thereof will be best understood from the following description of a specific embodiment when read in connection with the accompanying single figure of the drawing which is a schematic elevational view of apparatus for heat treating cement raw material or precipitated waste lime containing combustible constituents, in accordance with my invention.

Referring now to the drawing, there is shown a portion of a rotary kiln 1 and dust separator means in the form of a pair of cyclones 2 and 3. The cyclone 2 is connected by a waste gas duct or pipe 4 with the rotary kiln 1. The waste gas duct 4 has an upwardly extending riser portion 5 which extends above the cyclone 3 and a curved downcomer portion 6 descending towards and connecting with the cyclone 2 and having a larger cros ssection than that of the riser portion 5. The cyclone 2 is further provided at the lower end thereof with a precipitated material discharge duct 7 communicating with the rotary kiln 1. The cyclones 2 and 3 are connected to one another through a gas duct 8. A starting material supply pipe 9 is connected into the gas duct 8.

A gas discharge duct 10 with a blower or suction device 11 is connected to the upper end of the cyclone 3, and a precipitated material discharge dust 12 is connected to the lower conical end of the cyclone 3 and leads at the lower end thereof back into the riser portion 5 of the waste gas duct 4.

During operation of the afore-described device of my invention, cement raw material, interspersed for example with carbon, is admitted through the starting material supply pipe 9 into the gas duct 8. The raw material is entrained by the waste gases flowing upwardly from the cyclone 2 and heated to about 800 to 850° C., and is carried thereby into the cyclone 3 and separated therein. The cement raw material is thereby heated to about 380 to 520° C. The waste gases are withdrawn through the duct 10 from the cyclone 3 with the aid of the blower 11 while the cement raw material separated in the cyclone 3 descends through the duct 12 and discharges into the riser portion 5 of the waste gas duct 4. In the riser portion 5 of the waste gas duct 4, the raw material is entrained by the upwardly flowing waste kiln gases, which is heated to a temperature of about 1000 to 1300° C. and has an upward velocity of about 12 to 27 meters per second, and is circulated through the descending portion 6 of the waste gas duct 4 into the cyclone 2. The cross section of the descending portion 6 of the waste gas duct 4 is selected so that the gases descending downwardly with the cement raw material in the descending portion 6 of the waste gas duct 4 only has a velocity of about 1 to 5 meters per second. Because the cement raw material interspersed with carbon dust inclusions is passed through this relatively long duct or pipe 4 in suspension, complete combustion of the combustible constituent, such as the carbon dust, present in the cement raw material, is achieved. The air necessary for consuming these constituents is blown into the riser portion 5 of the waste gas duct 4 through a duct 13. The cement raw material treated in the afore-described manner is separated from the waste gas in the cyclone 2 and passes through the discharge duct 7 into the rotary kiln 1, while the waste gases are withdrawn from the cyclone 3 through the duct 10 with the aid of blower 11.

I claim:

1. Apparatus for heat treating cement raw material or precipitated waste lime material containing combustible constituent, comprising a kiln, dust separator means, a waste gas duct interconnecting said kiln and said dust separator means for conducting a flow of waste gas from said kiln to said dust separator means, and means for supplying the material containing combustible constituent into said flow whereby said combustible constituent is consumed, said waste gas duct having a riser portion extending above said duct separator means a curved downcomer portion extending downwardly to said dust separator means, said downcomer portion having a greater cross section than that of said riser portion, said dust separator means comprising a pair of interconnected cyclones, one of said cyclones being connected to said downcomer portion and having a discharge pipe connected to said kiln for conducting thereto material precipitated in said one cyclone, and the other of said cyclones having a discharge pipe connected to said riser portion for conducting thereto material precipitated in said other cyclone.

2. Apparatus for heat treating cement raw material or precipitated waste lime material containing combustible constituent, comprising a kiln, dust separator means, a waste gas duct interconnecting said kiln and said dust separator means for conducting a flow of waste gas from said kiln to said dust separator means, means for supplying the material containing combustible constituent into said flow whereby said combustible constituent is consumed, said waste gas duct having a riser portion extending above said dust separator means and a curved downcomer portion having a greater cross section than that of said riser portion, said dust separator means comprising a plurality of interconnected cyclones, one of said cyclones being connected to said downcomer portion and having a discharge pipe connected to said kiln for conducting thereto material precipitated in said one cyclone, and another of said cyclones having a discharge pipe connected to said riser portion for conducting thereto material precipitated in said other cyclone, and waste gas discharge means comprising an exhaust blower connected to said other of said cyclones.

3. Apparatus for heat treating cement raw material or precipitated waste line material containing combustible constituent, comprising a kiln, dust separator means, a waste gas duct interconnecting said kiln and said dust separator means for conducting a flow of waste gas from said kiln to said dust separator means, means for supplying the material containing combustible constituent into said flow whereby said combustible constituent is consumed, said waste gas duct having a riser portion extending above said dust separator means and a curved downcomer portion extending downwardly to said dust separator means, said downcomer portion having a greater cross section than that of said riser portion, and a supply duct communicating with said riser portion of said waste gas duct for supplying oxidizing gas thereto.

4. Apparatus according to claim 3 wherein said last-mentioned supply duct is an air supply duct.

References Cited

UNITED STATES PATENTS 3,116,054    12/1963    Bartmann _____ 263—32

JOHN J. CAMBY, Primary Examiner